Dec. 15, 1959 D. GOLDEN ET AL 2,917,726

MAGNETIC RECORDING SYSTEM

Filed March 25, 1955 4 Sheets-Sheet 1

INVENTORS.
DANIEL GOLDEN
& IRVIN I. KORN
BY S.C. Yuter
ATTORNEY.

INVENTORS.
DANIEL GOLDEN
& IRVIN I. KORN
BY S.C. Yuter
ATTORNEY.

GATE 222

GATE 222

BUFFER 246

BUFFER 246

PULSE AMPLIFIER 290

INVENTORS.
DANIEL GOLDEN
& IRVIN I. KORN
BY S.C. Yuter
ATTORNEY.

DELAY LINE 271

RESHAPER 328

DRUM READING AMPLIFIER 370

INVENTORS.
DANIEL GOLDEN
& IRVIN I. KORN
BY S.C. Yuter
ATTORNEY.

United States Patent Office 2,917,726

Patented Dec. 15, 1959

2,917,726

MAGNETIC RECORDING SYSTEM

Daniel Golden, Bronx, and Irvin I. Korn, Poughkeepsie, N.Y., assignors to Underwood Corporation, New York, N.Y., a corporation of Delaware Application March 25, 1955, Serial No. 496,857

7 Claims. (Cl. 340—174)

This invention relates to informatioin storage devices and more particularly to apparatus for storing information in binary digit form as signals on a magnetic medium.

Information may be represented by coded combinations of the binary digits one and zero. To represent a series of binary digits a series of pulses may be used where the presence of a pulse indicates binary one and the absence of a pulse indicates binary zero. The series of pulses are examined at specified time intervals. Hence the presence or absence of a pulse at specific time locations in the series as determined by timing signals determines the binary digits one and zero.

Since information can be represented as coded combinations of the binary digits one and zero, it is possible to store on a magnetic medium information represented by signals provided one of the characteristics of the recorded signals can always be interpreted as a binary zero and a second characteristic of the recorded signals can always be interpreted as a binary one.

In the digital computer art a magnetic drum is frequently employed as a magnetic storage medium. A magnetic drum is a rotatable cylinder fabricated from a non-magnetic material such as aluminum or copper. The periphery of the cylinder is plated with nickel or is coated with a magnetic material such as one of the oxides of iron. Magnetic recording and reproducing heads are placed close to the periphery of the drum. As the magnetic drum rotates a peripheral band of the magnetic drum passes under the recording and reproducing heads. Such a band is usually referred to as a track or channel.

During the recording operation, with the magnetic drum rotating, signals present in the recording head induce areas of magnetization on a track of the drum. When these areas of magnetization pass under the reproducing head corresponding signals are induced in the reproducing head.

Since the reproduced signals have a definite relationship to the previously recorded signals, it is possible to store information in the form of magnetization patterns on a magnetic drum.

The quality of the information signals reproduced from the magnetization patterns depends on two groups of factors, the first group is mechanical in nature and the second electrical in nature.

Mechanical factors include head design, head orientation and the peripheral speed of the magnetic drum. These mechanical factors will be assumed to be at their optimum design so that the quality of the reproduced signals is primarily dependent on electrical factors.

The reproduced signals are proportional to the rate of change of the magnetization on that portion of the magnetic drum passing under the reproducing head. The greater the rate of change of the magnetization the greater the amplitude of the reproduced signal.

The waveform of the magnetization pattern primarily depends on the flux produced by the recording head. A recording head in its simplest form is a ring or toroid fabricated from a material having a low value of reluctance. A gap is cut into the ring to form a high reluctance element in series with the low reluctance element formed by the ring. The high reluctance gap is positioned opposite the periphery of the magnetic drum. A few turns of wire forming a winding are wound around the ring. Current passing through the winding creates a flux which forms a closed path in the ring. Since the flux seeks a path of minimum reluctance, the gap, which is a high reluctance element, is partially bypassed by the surface of the magnetic drum directly opposite the gap. The bypassing or fringing flux results in a magnetic recording along a section of the track. Therefore when a current pulse passes through the winding a flux pulse is induced in the ring and a corresponding state of magnetization is recorded on the surface of the drum. It should be noted that the faster the rise time of the current pulse in the winding the more rapid is the change in magnetization of the surface of the magnetic drum opposite the gap. It should also be noted that the greater the magnitude of the current pulse the greater the change in magnetization. Therefore the best recordings are achieved by using current pulses having high amplitudes and fast rise times.

In order to obtain high amplitude current pulses in the winding of a magnetic head which has a relatively low impedance, amplifiers having an output transformer are preferably employed in order to obtain a high current low voltage writing signal.

An additional value of employing an output transformer is that the output impedance of the writing amplifier may readily be matched to the input impedance of the magnetic head. Further, the use of an output transformer minimizes the overall cost of the writing amplifier since fewer vacauum tubes are required to develop a suitable signal writing current. Therefore to achieve these advantages it is necessary to record with a signal which may be amplified by an amplifier having an output transformer.

The simplest method of recording information which is initially represented by combinations of pulses is to produce corresponding magnetization spots with the presence of a magnetized spot indicating a binary one and the absence of a magnetization spot indicating a binary zero. Therefore the waveform of the writing current would consist of the corresponding presence and absence of current pulses.

Another method of storing the binary digits is by using magnetization patterns of opposite polarity. A positive magnetization pattern can indicate binary one and a negative magnetization pattern can indicate binary zero. Each digit is therefore represented by a distinct characteristic, namely, the polarity of the magnetization pattern. In this case the polarity of the writing current pulse induces the magnetization patterns desired.

The use of these types of current pulse waveforms creates special problems in the design of the circuitry for handling them since the average value of the voltages in either of these waveforms is a function of the binary digits being represented by the waveform and if the average value is not zero then an amplifier having an output transformer cannot easily be used.

Consider the first waveform cited, the presence of a current pulse indicating a binary one, the absence of a current pulse indicating a binary zero. Assuming all pulses are of equal amplitude, the presence of all binary ones creates a certain average voltage called the D.-C. component of the waveform. The presence of all binary zeros creates a D.-C. component equal to zero volts. Any combination of binary ones and zeros will cause a D.-C. component which is somewhere between these limits. Further, as the signal pattern varies the D.-C. component changes value.

The same problem arises for the second waveform cited,

Assuming both the positive and negative pulses have equal amplitude, it will be noted that a pulse train representing all binary ones will have a positive D.-C. component while a pulse train for representing all binary zeros will have a negative D.-C. component, while combinations of binary ones and zeros will create different D.-C. components.

To avoid the problem of D.-C. components of varying voltage so that transformer coupling may be employed a third type of waveform has been proposed. In accordance with this method, binary one is represented by an abrupt transition from a positive D.-C. voltage level to a negative D.-C. voltage level of equal amplitude and binary zero is represented by an abrupt transition from the negative D.-C. voltage level to the positive D.-C. voltage level. Thus, each waveform by itself has an average D.-C. component equal to zero and hence any combination of these waveforms will always have an average D.-C. component equal to zero and output transformers may be utilized.

However, due to the fact that high currents are always flowing in the secondary winding of the output transformer the secondary winding must be relatively large in order to dissipate the heat which is produced. Unfortunately, this requirement adversely affects the rise time of the writing current pulse since the bulkiness of the windings increases the leakage inductance of the transformer and the greater the leakage inductance the longer the rise time. Hence the quality of the recorded signal is not an optimum.

Therefore, an object of the invention is to provide recording apparatus employing amplifiers using output transformers for producing high current recording pulses having a very fast rise time.

Another object of the invention is to provide magnetic recording apparatus which may utilize relatively small output transformers in the recording amplifiers while generating high current recording pulses.

A more general object of the invention is to provide an improved magnetic storage system.

It is a further object of the invention to provide an improved magnetic storage system utilizing waveforms having a zero direct current component.

According to the invention apparatus is provided for generating a recording current waveform each portion of which represents a binary digit. One of the binary digits is represented by a positive and a negative pulse separated by a predetermined duration of time. The other binary digit is represented by a negative and a positive pulse separated by a similar time interval.

An advantage of the invention is that larger peak currents may be delivered by the transformer and consequently greater amplitudes of magnetization can be recorded.

Another advantage of the invention is that by using the separated current pulses the effect of a current pulse on the magnetization pattern of a previously recorded current pulse is minimized. Hence each change in the magnetization pattern is more definitely located and less dependent on the adjacent areas of magnetization.

Other objects, features and advantages of the invention will be more clearly understood from the following description and drawing wherein.

Figure 3A:
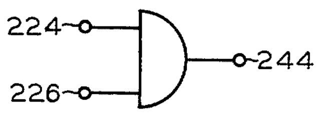

Fig. 3*a* shows the symbol for a gate.

Figure 3B:
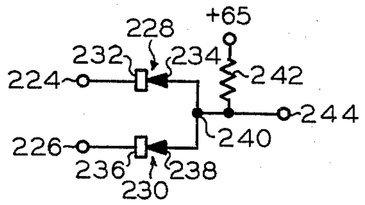

Fig. 3*b* shows the circuitry of the gate in Fig. 3*a*.

Figure 4A:
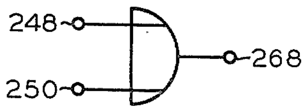

Fig. 4*a* symbolically shows a buffer.

Figure 4B:
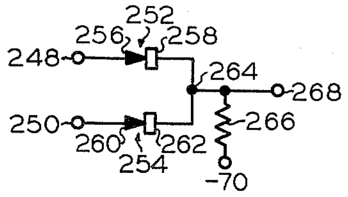

Fig. 4*b* is a schematic diagram of the buffer in Fig. 4*a*.

Figure 5A:
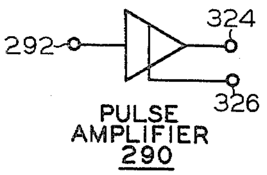

Fig. 5*a* is the symbol for a pulse amplifier.

Figure 5B:
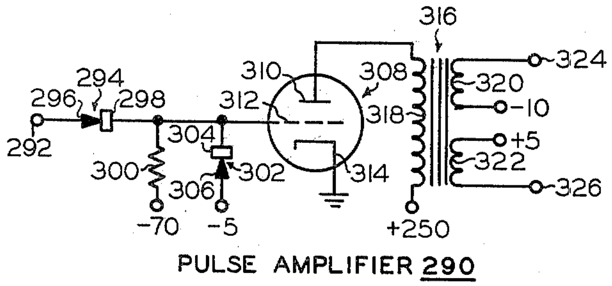

Fig. 5*b* shows the circuit details of the pulse amplifier of Fig. 5*a*.

Figure 6A:
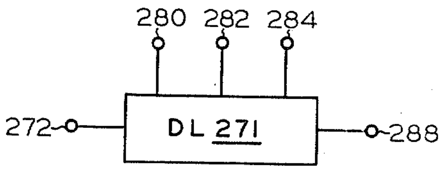

Fig. 6*a* shows a delay line in symbolic form.

Figure 6B:
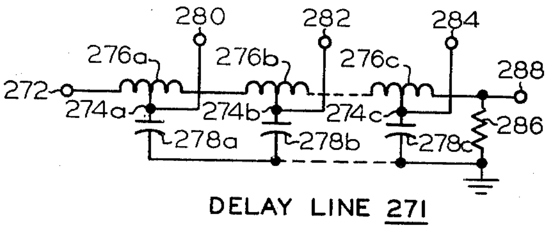

Fig. 6*b* schematically shows the circuit elements of the delay line of Fig. 6*a*.

Figure 7A:
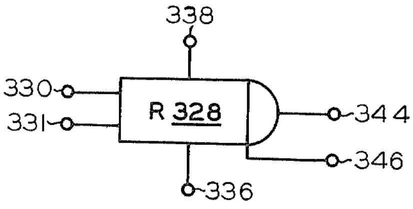

Fig. 7*a* shows the symbol for a reshaper.

Figure 7B:
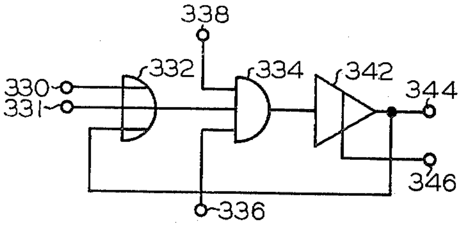

Fig. 7*b* illustrates by means of symbols the reshaper of Fig. 7*a*.

Figure 8A:
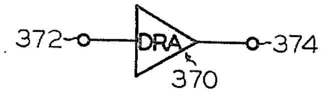

Fig. 8*a* shows a drum reading amplifier in symbolic form.

Figure 8B:
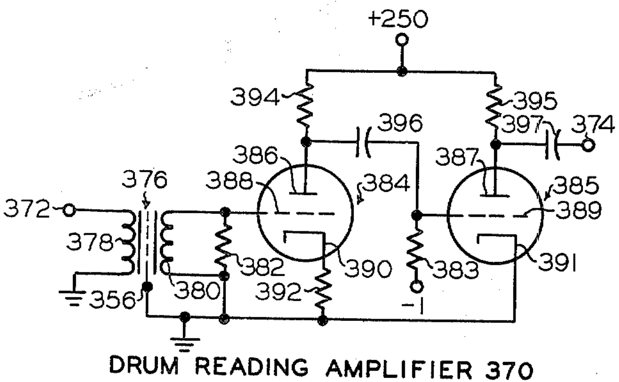

Fig. 8*b* shows schematically the drum reading amplifier of Fig. 8*a*.

Figure 1:
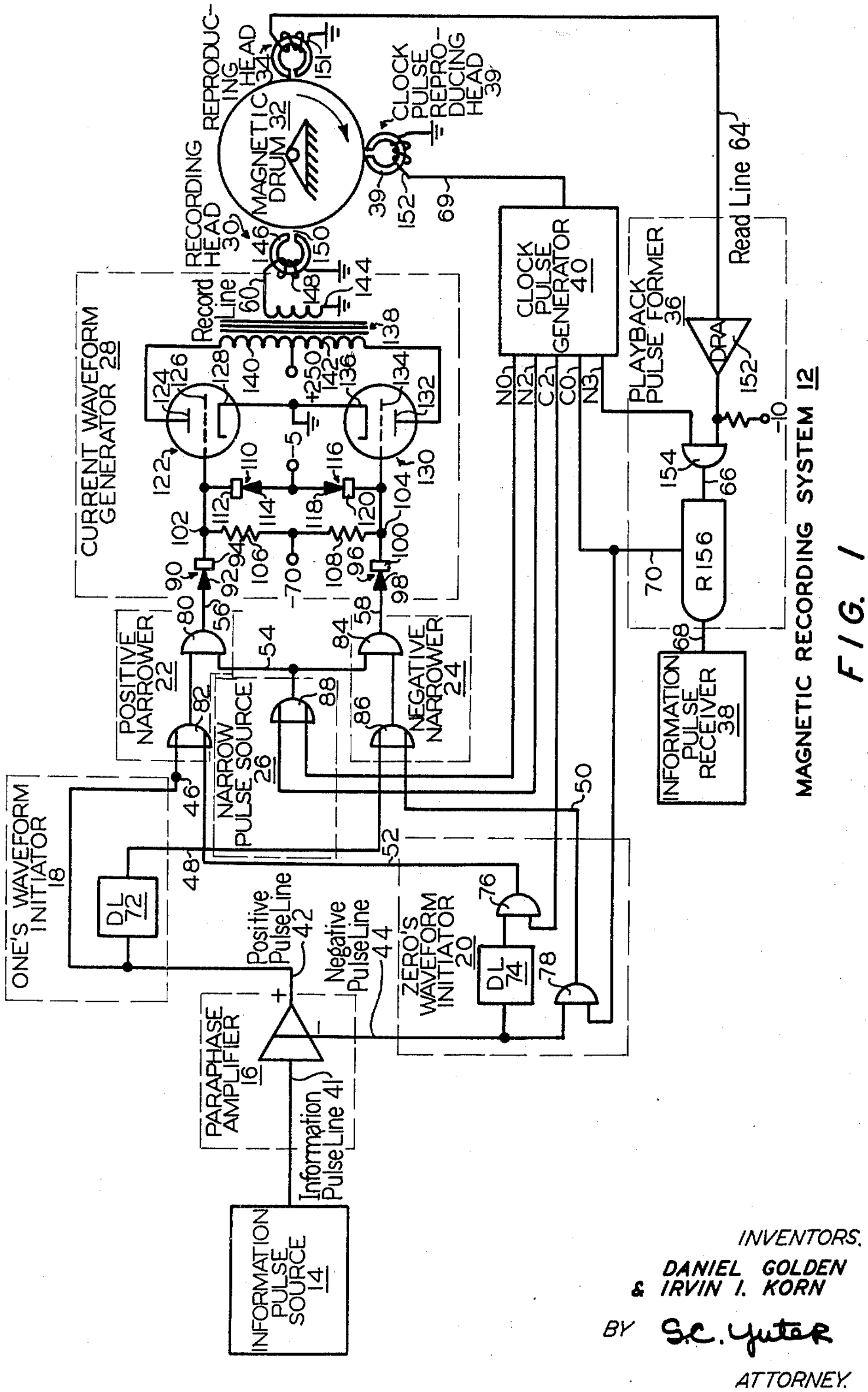
Fig. 1 shows a preferred embodiment of the invention.

Referring to Fig. 1, the magnetic recording system 12 is shown comprising the information pulse source 14, the paraphase amplifier 16, the "one's" waveform initiator 18, the "zero's" waveform initiator 20, the positive narrower 22, the negative narrower 24, the narrow pulse source 26, the current waveform generator 28, the recording head 30, the magnetic drum 32, the reproducing head 34, the playback pulse former 36, the information pulse receiver 38, the clock pulse reproducing head 39 and the clock pulse generator 40.

The information pulse source 14 is connected via the information pulse line 41 to the paraphase amplifier 16. The positive output terminal of the paraphase amplifier 16 is coupled via positive pulse line 42, to the input terminal of the "one's" waveform initiator 18 and the negative output terminal is connected via the negative pulse line 44 to the input terminal of the "zero's" waveform initiator 20.

One of the output terminals of the "one's" waveform initiator 18 (actually a continuation of positive pulse line 42) is coupled to an input terminal 46 of the positive narrower 22. The second output terminal of the "one's" waveform initiator 18 is connected via the delayed positive pulse line 48 to an input terminal of the negative narrower 24.

One of the output terminals of the "zero's" waveform initiator 20 is coupled to the other input terminal of the positive narrower 22 by the delayed gated pulse line 52. The second output terminal of the "zero's waveform initiator 20 is connected via the gated pulse line 50 to the negative narrower 24.

The output terminal of the positive narrower 22 is connected to a first input terminal of the current waveform generator 28 by the narrow positive pulse line 56. The output terminal of the negative narrower 24 is connected to a second input terminal of the current waveform generator 28 via the narrow negative pulse line 58.

The output of the current waveform generator 28 is connected to the recording head 30 via the record line 60. The reproducing head 34 is coupled via the read line 64 to the playback pulse former 36. The output terminal of the playback pulse former 36 is connected to the information pulse receiver 38 by the reshaped pulse line 68.

The clock pulse reproducing head 39 is coupled to the clock pulse generator 40 by the line 69. The several output terminals of the clock pulse generator 40 are connected to various components of the apparatus by lines whose designations correspond to the signal names carried by the lines. The N0 and N2 lines couple the N0 and N2 signal output terminals of the clock pulse generator 40 to the input terminals of the narrow pulse source 26. The C0 and C2 lines couple the C0 and C2 signal output terminals of the clock pulse generator 40 to input terminals of the "zero's" waveform initiator 20. The C0 line also couples the C0 output terminal of the pulse generator 40 to the clocking input terminal 70. The N3 line also connects the N3 signal output terminal to a timing input terminal of playback pulse former 36.

The "one's" waveform initiator 18 is shown comprising the delay line 72, an electrical network capable of receiving a pulse at its input terminal and transmitting the same pulse from its output terminal a predetermined time later. The input terminal to the delay line 72 is coupled to positive pulse line 42 and the output terminal to delayed positive pulse line 48. Positive pulse line 42 is also included as part of the "one's" waveform initiator 18 for the sake of more logically presenting the description of the apparatus.

The "zero's" waveform initiator 20 is shown comprising the delay line 74 (which is identical to the delay line 72) and the gates 76 and 78. The gates 76 and 78 are coincidence circuits each of which will have present at their output terminals the most negative voltage present at any one of their respective input terminals.

The input terminal of the delay line 74 is coupled to the negative pulse line 44 and the output terminal of the delay line 74 is connected to an input terminal of the gate 76. The second input terminal of the gate 76 is coupled to the C2 line. The output terminal of the gate 76 is connected to the delayed gated pulse line 52.

One input terminal of the gate 78 is coupled to the negative pulse line 44 and the second input terminal of the gate 78 is coupled to the C0 line. The output terminal of the gate 78 is connected to the gated pulse line 50.

The positive narrower 22 is shown comprising the gate 80 and the buffer 82. The gate 80 is similar to the previously described gates 76 and 78. The buffer 82 is an electrical circuit which functions so as to have present at its output terminal the most positive voltage present at any one of its input terminals.

The input terminal 46 of positive narrower 22 is also an input terminal to the buffer 82. The second input terminal of the buffer 82 is connected to the delayed gated pulse line 52. The output terminal of the buffer 82 is coupled to an input terminal of the gate 80. The second input terminal of the gate 80 is connected to the narrow pulse line 54.

The negative narrower 24 is shown comprising the gate 84 and the buffer 86, both of which are similar to the previously described gates and buffers. One input terminal of the buffer 86 is connected to the delayed positive pulse line 48 and the second input terminal to the buffer 86 is connected to the gated pulse line 50.

The output terminal of the buffer 86 is connected to an input terminal of the gate 84, the second input terminal to the gate 84 is connected to the narrow pulse line 54. The output terminal of the gate 84 is coupled to the narrow negative pulse line 58.

The narrow pulse source 26 is the buffer 88. One input terminal of the buffer 88 is coupled to the N0 line and the second input terminal of the buffer 88 is connected to the N2 line. The output terminal of the buffer 88 is connected to the narrow pulse line 54.

The current waveform generator 28 is shown comprising the diode 90, with anode 92 and cathode 94, the diode 96, with anode 98 and cathode 100, the resistors 106 and 108, the diode 110, with cathode 112 and anode 114, the diode 116, with anode 118 and cathode 120, the triode vacuum tube 122 with anode 124, control grid 126 and cathode 128, the triode vacuum tube 130 with anode 132, control grid 134, and cathode 136, the transformer 138 with primary leg 140, primary leg 142 and secondary winding 144.

The anode 92 of the diode 90 is connected to the narrow positive pulse line 56 and the cathode 94 of the diode 90 is coupled to the junction 102. One end of resistor 106 is also connected to the junction 102, and the other end of the resistor 106 is connected to a negative seventy volt supply. The cathode 112 of the diode 110 is connected to the junction 102 while the anode 114 of the diode 110 is connected to a negative five volt supply.

The junction 102 is connected to the control grid 126 of the triode vacuum tube 122. The cathode 128 of the triode vacuum tube 122 is grounded. The anode 124 of the triode vacuum tube 122 is coupled to a positive two hundred and fifty volt supply via the primary leg 140 of the transformer 138.

The anode 98 of the diode 96 is connected to the narrow negative pulse line 58 and the cathode 100 of the diode 96 is connected to the junction 104. One end of the resistor 108 is also connected to the junction 104 and the other end of the resistor 108 is connected to a negative seventy volt supply. The cathode 120 of the diode 116 is connected to the junction 104 and the anode 118 of the diode 116 is returned to a negative five volt supply.

The junction 104 is coupled to the control grid 134 of the triode vacuum tube 130. The cathode 136 of the triode vacuum tube 130 is connected to ground and the anode 132 of tube 130 is coupled to a positive two hundred and fifty volt supply via the primary leg 142 of the transformer 138.

One end of the secondary winding 144 of the transformer 138 is returned to ground and the other end of the secondary winding 144 is connected to the record line 60. The relative phasing of the primary legs 140 and 142 and the secondary winding is such that current flow from the positive two hundred and fifty volt supply to the plate 124 through thet primary leg 140 causes a current flow in the secondary winding 144 from ground to the record line 60 and a current flow from the positive two hundred and fifty volt supply through the primary leg 142 to the plate 132 causes a current flow in the secondary winding 144 from the record line 60 to ground. The current waveform generator 28 can be considered a push-pull amplifier.

The recording head comprises a magnetic core 146 with a nonmagnetic gap 150 positioned opposite the magnetic drum 32. The winding 148 is one or more turns of wire wrapped about the magnetic core 146. One end of the winding 148 is grounded, the other end is connected to the record line 60.

The reproducing head 34 is similar in construction to the recording head 30 and is positioned opposite the magnetic drum 32 so as to "pick up" from the drum any signals recorded on the magnetic drum 32 by the recording head 30. In the art, it is said that both heads are opposite the same track or channel of the magnetic drum 32.

One end of the winding 151 of the reproducing head 34 is grounded and the other end is connected to the read line 64. Although distinct recording and reproducing heads are shown it should be noted that a single head can be used with switching circuitry so that the head can be connected to either the recording or reproducing circuits.

The playback pulse former 36 is shown comprising the drum reading amplifier 152, the gate 154 and the reshaper 156. The drum reading amplifier 152 is a high gain linear amplifier which will be more fully described below. The input terminal of the drum reading amplifier is connected to the read line 64 and the output terminal is connected to an input terminal of the gate 154. The second input terminal of the gate 154 is connected to the N3 line. The output terminal of the gate 154 is coupled to the input terminal of the reshaper 156 via the sampled pulse line 66.

Reshaper 156 is an electronic circuit which upon receipt of a misshapen pulse at its input terminal passes a well defined pulse at its output terminal. The reshaper 156 has a timing input terminal 70 which causes the reshaped pulse to occur in synchronism with the reference signals of the apparatus. The timing input terminal 70 is connected to the C0 line. The output terminal of the reshaper 156 is coupled to the information pulse receiver 38 via the reshaped pulse line 68.

The clock pulse reproducing head 39 is of similar construction as the two previously described heads. The clock pulse reproducing head is positioned opposite another track of the magnetic drum 32. Upon this track are recorded a series of periodically spaced areas of magnetization.

The winding 152 is coupled to the clock pulse generator 40 via the line 69. As the magnetic drum 32 rotates, the areas of magnetization induce voltage pulses in the winding 152. The voltage pulses are then fed to the clock pulse generator 40. In the clock pulse generator 40 the pulses are amplified and shaped to form a periodic square wave which is then designated the C0 signal. The remaining output signals of the clock pulse generator are then derived from the C0 signal by any one of a number of common techniques which are familiar to those skilled in the art of pulse techniques.

The magnetic recording system 12 of Fig. 1 will be described with reference to the waveform diagram of Fig. 2.

Figure 2:
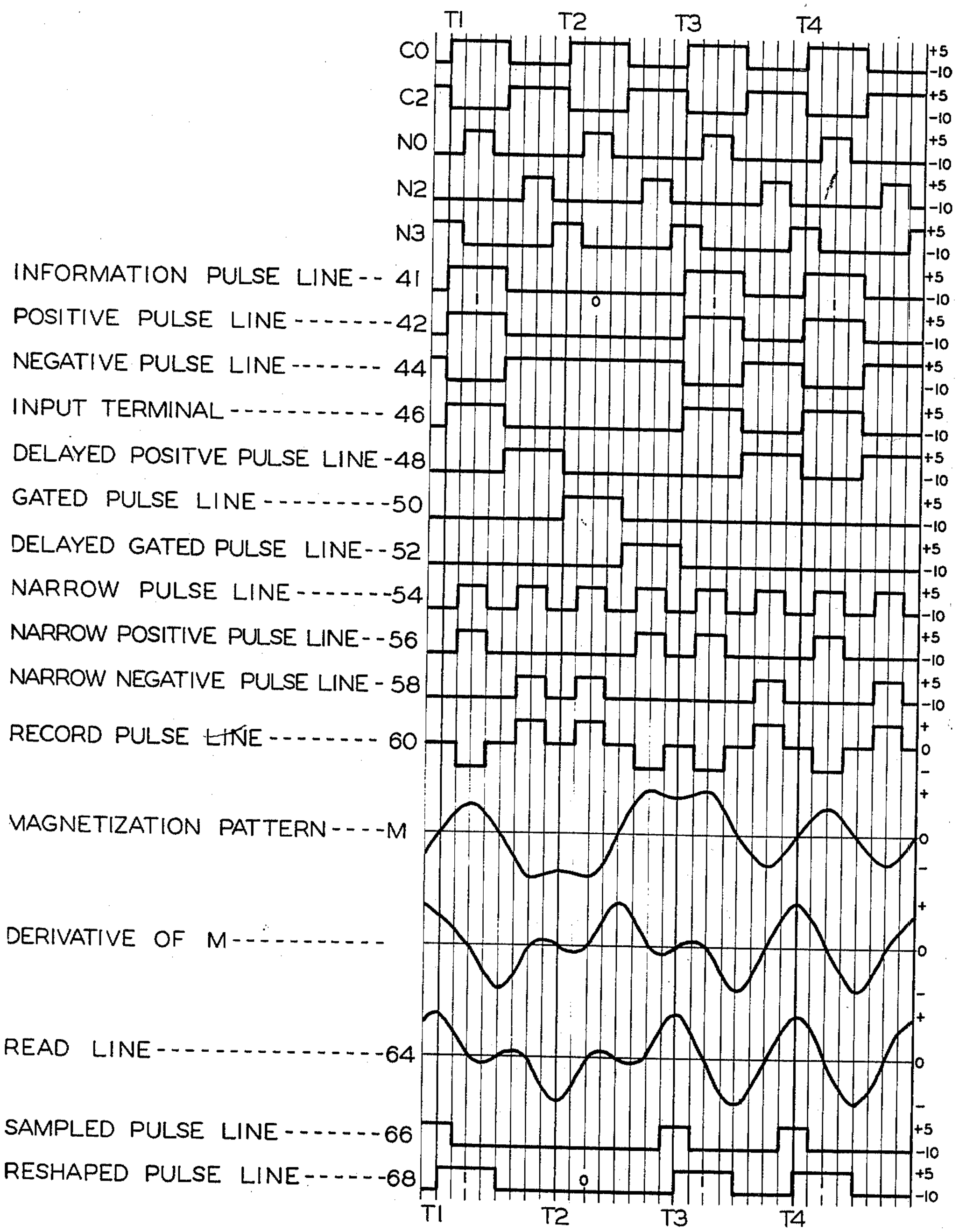
Fig. 2 shows the waveforms associated with the apparatus.

The waveforms of Fig. 2 are plots of the potentials existing on all the pertinent lines of the magnetic recording system 12 where the ordinate indicates the magnitude of the potential and the abscissa indicates time.

In a preferred embodiment of the invention, the magnetic recording system 12 will be shown as operating in synchronism with a master timing device or "clock." As an example, in the digital computer art such timing devices are usually called clock pulse generators. Their function is to generate at least one periodically occurring waveform to which all waveforms or pulse patterns in the digital computer are referred. The clock pulse generator 40 is such a device. The C0 signal of Fig. 2 will hereinafter be considered as the reference waveform. The C0 signal is a constant frequency square wave having a period usually in the microsecond range. In the description of the functioning of the apparatus it will be necessary to discuss time durations which will hereinafter be called pulse times. A pulse time is defined as being equal to the period of a C0 square wave. The abscissa of Fig. 2 is marked in units of time equal to the period of a C0 waveform where T1 indicates the occurrence of a first C0 signal, T2 the second, etc.

Several signals are readily derivable from the C0 signal. The signal C2 also shown in Fig. 2 is the inverse of the C0 signal. It should be noted that the C2 signal is readily derived from C0 by either inverting the C0 signal or by delaying the C0 signal a half a pulse time.

The N0, N2 and N3 signals are a series of periodically occurring narrow pulses whose duration is one fourth a pulse time. The phase relationship of the narrow pulses with respect to the C0 signal is readily seen in Fig. 2.

The remaining waveforms of Fig. 2 occur on the designated signal lines and will be referred to during the description of the magnetic recording system 12 of Fig. 1.

To illustrate the functioning of the magnetic recording system 12, assume the binary digits 1011 are to be serially recorded. Referring to the apparatus of Fig. 1 and the waveforms of Fig. 2, it is seen that at T1 a pulse is present on information pulse line 41 indicating the insertion of binary one into the apparatus. The pulse enters paraphase amplifier 42 causing the positive output terminal of the amplifier to assume a positive potential for the duration of the pulse. In other words the positive output passes a pulse into positive pulse line 42. The pulse enters the positive narrower 22 via the input terminal 46 of the buffer 82. The pulse permits a narrow pulse from narrow pulse source 26 via narrow positive pulse line 54 to be gated through the gate 80 to the narrow positive pulse line 56 and into the current waveform generator 28 via the diode 90. The network comprising the diode 110 and the resistor 106 tends to maintain the triode vacuum tube 122 at close to the cutoff condition. The narrow pulse fed through the diode 90 raises the potential of the grid 126 of the triode vacuum tube 122 to a value above ground potential causing a pulse of current to flow from the positive two hundred and fifty volt supply through the primary leg 140 to the plate 124. This flow of current induces a flow of current in the secondary winding 144 of the transformer 138 from ground to the record line 60. This flow of current is shown as the negative pulse on the waveform of line 60 in Fig. 2. Upon the disappearance of the narrow pulse at the grid 126 the current flow returns to zero.

The positive pulse that is passed to the positive pulse line 42 also enters the delay line 72 when after a one half pulse time delay it is transmitted to the delayed positive pulse line 48. The positive pulse on the delayed positive pulse line 48 enters the negative narrower 24 via an input terminal of the buffer 86. The pulse is then fed from the output terminal of the buffer 86 to an input terminal of the gate 84. The presence of the pulse at the input terminal permits a narrow pulse from narrow pulse line 54 to pass through the gate 84 to the narrow negative pulse line 58.

This narrow pulse thus enters the current waveform generator 28 via the anode 98 of the diode 96. The network comprising the diode 116 and the resistor 108 has been maintaining the junction 104 and therefore the grid 134 of the triode vacuum tube 130 close to the cutoff bias. When the narrow pulse is passed by the diode 96 the potential of the grid 134 is raised to above ground potential causing a current to flow from the positive two hundred and fifty volt supply through the primary leg 142 of the transformer 138 to the plate 132 of the triode vacuum tube 130. This flow of current induces a current flow in the secondary winding 144 from the record line 60 to ground. This flow of current is shown as a positive pulse on line 60 of Fig. 2. Upon the disappearance of pulse at the grid 134 current flow in the record line 60 returns to zero.

At T2 no pulse is present on the information pulse line 41 hence the negative output of the paraphase amplifier 16 is at a positive potential. The positive potential is fed by the negative pulse line 44 to an input of the gate 78 permitting a C0 signal present on the second input to the gate 78 to pass as a positive pulse into the gated pulse line 50. The pulse enters the negative narrower 24 via an input terminal of the buffer 86. The positive pulse passes through the buffer 86 to an input terminal of the gate 84 permitting a narrow pulse present on the narrow pulse line 54 to be gated through to the narrow negative pulse line 58.

The narrow pulse then enters the current waveform generator 28 via the anode 98 of the diode 96. When the pulse is present at the junction 104, the potential of the control grid 134 of the triode vacuum tube 130 switches from the near cutoff value to a positive bias value causing a current to flow from the positive two hundred and fifty volt supply through the primary leg 142 of the transformer 138 to the anode 132 of the triode vacuum tube 130. This flow of current induces a current flow in the secondary winding 144 from the record line 60 to ground. Upon termination of the pulse the current flow in record line 60 returns to zero.

The positive potential that existed on the negative pulse line 44 is also fed to the delay line 74 where after a half pulse time delay manifests itself at an input of the gate 76 permitting a C2 signal to pass as a positive pulse onto the delayed gated pulse line 52. The pulse enters the positive narrower 22 via an input terminal of the buffer 82 and is passed to an input terminal of the gate 80. At the gate 80 the presence of the positive pulse permits a narrow pulse from the narrow pulse line 54 to enter the narrow positive pulse line 56.

The pulse now present on the narrow positive pulse line 56 enters current waveform generator 28 via the anode 92 of the diode 90. The pulse causes the potential of the grid 126 of the triode vacuum tube 122 to rise from a nearly cutoff value to above ground potential. The rise in grid potential results in a current flow from the positive two hundred and fifty volt supply through the primary leg 140 of the transformer 138 to the anode 124 of the vacuum tube triode 122. By virtue of the usual transformer action a current is induced in the secondary winding 144, the flow of current being from the grounded end of the secondary winding 144 to the record line 60. When the pulse disappears from the grid 126 the current in the record line 60 returns to the zero value.

The binary digit "one" present on the information pulse line 41 at time T3 is acted upon in the same manner as the binary digit one occurring at T4.

Particularly reference is drawn to the waveform of the record line 60 shown in Fig. 2. It will be recalled that at time T1 a pulse entered the system indicating a binary one. It is seen that approximately one eighth of a pulse time after the receipt of the pulse a narrow negative going current pulse is generated whose duration is a quarter of a pulse time. After the current has returned to zero another quarter of a pulse time elapses before a positive going current pulse of the same time duration as the negative going pulse is generated. At the end of the pulse an eighth of a pulse time elapses before the system receives another signal representing a binary digit at T2.

It should be noted that the current waveform representing binary zero is the same as the current waveform representing binary one except for the order of occurrence of the positive and negative going current pulses.

It is readily seen from the waveform that the steady D.-C. component is always equal to zero and that current is flowing only fifty percent of the time. Since separate tubes generate the different polarity pulses it should be realized from the example shown that each tube only operates twenty-five percent of the time.

The current flow through the line 60 enters the winding 148 of the recording head 30 creating a varying flux in the head. The fringing of the flux at the gap 150 forms a magnetization pattern as shown by the waveform of the magnetization pattern line M of Fig. 2. This waveform is longitudinally recorded along a channel of the rotating magnetic drum 32.

As this magnetization pattern passes under the reproducing head 34 a voltage signal which is essentially proportional to the derivative of the magnetization waveform is induced in the winding 151 and fed to the read line 64. Such a waveform is shown on read line 64 of Fig. 2.

It should be noted that there is a delay from the time the signal is recorded to when it is reproduced due to the physical displacement of the recording and reproducing heads. In the waveforms of the reproduced signal no delay is shown only for convenience in presenting the waveforms.

The reproduced signal enters the playback pulse former 36 via the input terminal of the drum reading amplifier 152. The function of the drum reading amplifier is to amplify the signal and change the impedance level. The amplified signal is fed to an input terminal of the gate 154. The second input terminal of the gate 154 is connected to the N3 line. The N3 signal as seen in Fig. 2 is a narrow pulse occurring in a fixed time relation with the C0 signal. Since the magnetization pattern has a fixed time relationship with the C0 signal there is a definite time relationship between the playback signal derived from the magnetization pattern and the N3 signal. The role of the N3 signal is to periodically sample the playback signal as it enters the gate 154. Whenever the playback signal is positive during the occurrence of the N3 signal a narrow pulse is passed to the sampled pulse line 66.

The narrow pulses present on the line 66 are fed to the reshaper 156 where they are broadened and formed into pulses which occur at the same time as the C0 signals. The output terminal of the reshaper 156 then feeds the playback information via the reshaped pulse line 68 to the information pulse receiver 38.

Attention is drawn to the "phase" relationship of the signals on read line 64 and the N3 signal. The signals must have the proper phase relation so as to gate the correct information at the line 66. This relationship is obtained by the proper lateral positioning of the reproducing head 34 along the track of the magnetic drum 32.

In practice the peripheral displacement of the recording and reproducing heads 30 and 34 is roughly adjusted to introduce a delay which is slightly less than the desired delay. A delay line with a variable delay is serially introduced between the output terminal of the drum reading amplifier 152 and the gate 154. The variable delay is then adjusted to produce the desired phase relationship of the two signals.

*Description of symbols*

The schematic equivalents of the symbols which have been employed to simplify the detailed description of the units of the apparatus which have been illustrated in block form are shown in Figs. 3 through 8. For convenient reference, all positive and negative supply buses will generally be identified with a number corresponding with their voltage. The circuitry terminals corresponding to the same symbol terminals are identified by the same character reference numbers.

*Gate*

The gates used in the apparatus are of the "coincidence" type, each comprising a crystal diode network which functions to receive input signals via plurality of input terminals and to pass the most negative signal.

The symbol for a representative gate 222, having two input terminals 224 and 226, is shown in Fig. 3*a*. The signal potential levels are assumed to be plus five volts (positive signals) and minus ten volts (negative signals) so the potentials of the signals which may exist at the input terminals 224 and 226 are thereby limited.

If a potential of minus ten volts is present at one or both of the input terminals 224 and 226, a potential of minus ten volts exists at the output terminal 244. Therefore, if one of the input signals to the input terminals 224 and 226 is positive and the other signal is negative, the negative signal is passed and the positive signal is "blocked."

When there is a coincidence of positive signals at the two input terminals 224 and 226, a positive signal is transmitted from the output terminal 244. In such case, it may be stated that a positive signal is "gated" or "passed" by the gate 222.

The schematic details of the gate 22 are shown in Fig. 3*b*. Gate 222 includes the crystal diodes 228 and 230. Each of the input terminals 224 and 226 is coupled to one of the crystal diodes 228 and 230. Crystal diode 228 comprises the cathode 232 and the anode 234. Crystal diode 230 comprises the anode 238 and the cathode 236. More particularly, the input terminals 224 and 226 are respectively coupled to the cathode 232 of the crystal diode 228 and the cathode 236 of the crystal diode 230. The anode 234 of the crystal diode 228 and the anode 238 of the crystal diode 230 are interconnected at the junction 240. The anodes 234 and 238 are coupled via the resistor 242 to the positive voltage bus 65.

If negative potentials are simultaneously present at the input terminals 224 and 226, both of the crystal diodes 228 and 230 conduct, since the positive supply bus 65 tends to make the anodes 234 and 238 more positive. The voltage at the junction 240 will then be minus ten volts since, while conducting, the anodes 234 and 238 of the crystal diodes 228 and 230 assume the potential of the associated cathodes 232 and 236.

When a positive signal is fed only to the input terminal 224, the cathode 232 is raised to a positive five volts potential and is made more positive than the anode 234, so that crystal diode 228 stops conducting. As a result, the potential at the junction 240 remains at the negative ten volts level. In a similar manner, when a positive signal is only present at the input terminal 226, the voltage at the junction 240 will not be changed.

When the signals present at both input terminals 224 and 226 are positive, the anodes 234 and 238 are raised to approximately the same potential as their associated cathodes 232 and 236 and the potential at the junction 240 rises to a positive potential of five volts.

The potential which exists at the junction 240 is transmitted from the gate 222 via the connected output terminal 244.

In the above described manner, the gate 222 is frequently used as a switch to govern the passage of one signal by the presence of one or more signals which control the operation of the gate 222.

It should be understood that the potentials of plus five volts and minus ten volts used for purpose of illustration are approximate, and the exact potentials will be affected in two ways. First, they will be affected by the value of the resistance 242 and its relation to the impedances of the input circuits connected to the input terminals 224 and 226. Second, they will be affected by the fact that a crystal diode has some resistance (i.e., is not a perfect conductor) when its anode is more positive than its cathode, and furthermore will pass some current (i.e., does not have infinite resistance) when its anode is more negative than its cathode. Nevertheless, the assumption that signal potentials are either plus five or minus ten volts is sufficiently accurate to serve as a basis for the description of the operations taking place in the apparatus.

A clamping diode may be connected to the output terminal 244 to prevent the terminal from becoming more negative than a predetermined voltage level to protect the diodes 228 and 230 against excessive back voltages and to provide the proper voltage levels for succeeding circuits.

*Buffer*

The buffers used in the apparatus are also known as "or" gates. Each buffer comprises a crystal diode network which functions to receive input signals via a plurality of input terminals and to pass the most positive signal.

The symbol for a representative buffer 246, having two input terminals 248 and 250, is shown in Fig. 4*a*. Since the signal potential levels in the system are assumed to be minus ten volts and plus five volts, either one of these potentials may exist at the input terminals 248 and 250.

If a positive potential of five volts exists at one or both of the input terminals 248 or 250, a positive potential of five volts exists at the output terminal 268. If a negative potential of ten volts is present at both of the input terminals 248 and 250, a negative potential of ten volts will be present at the output terminal 268.

The schematic details of the buffer 246 are shown in Fig. 4*b*. The buffer 246 includes the two crystal diodes 252 and 254. The crystal diode 252 comprises the anode 256 and the cathode 258. Crystal diode 254 comprises the anode 260 and the cathode 262. The anode 256 of the crystal diode 252 is coupled to the input terminal 248. The anode 260 of the crystal diode 254 is coupled to the input terminal 250. The cathodes 258 and 262 of the crystal diodes 252 and 254, respectively, are joined at the junction 264 which is coupled to the output terminal 268, and via the resistor 266 to the negative supply bus 70. The negative supply bus 70 tends to make the cathodes 258 and 262 more negative than the anodes 256 and 260, respectively, causing both crystal diodes 252 and 254 to conduct.

When negative ten volt signals are simultaneously present at input terminals 248 and 250, the crystal diodes 252 and 254 are conductive, and the potential at the cathodes 258 and 262 approaches the magnitude of the potential at the anodes 256 and 260. As a result, a negative potential of ten volts appears at the output terminal 268.

If the potential at one of the input terminals 248 or 250 increases to plus five volts, the potential at the junction 264 approaches the positive five volts level as this voltage is passed through the conducting crystal diode 252 or 254 to which the voltage is applied. The other crystal diode 252 or 254 stops conducting since its anode 256 or 260 becomes more negative than the junction 264. As a result, a positive potential of five volts appears at the output terminal 268.

If positive five volt signals are fed simultaneously to both input terminals 248 and 250, a positive potential of five volts appears at the output terminal 268, since both crystal diodes 252 and 254 will remain conducting. Thus the buffer 246 functions to pass the most positive signal received via the input terminals 248 and 250.

*Pulse amplifier*

The symbol for a representative pulse amplifier is shown in Fig. 5*a*. When a positive pulse is fed to the pulse amplifier 290 via the input terminal 292, the pulse amplifier 290 functions to transmit a positive pulse which swings from minus ten to plus five volts from its positive output terminal 324, and a negative pulse which swings from plus five to minus ten volts from its negative output terminal 326. At all other times, the pulse amplifier 290 has a negative potential of ten volts at its positive output terminal 324 and a positive potential of five volts at its negative output terminal 326.

The detailed circuitry of the pulse amplifier 290 is shown in Fig. 5*b*. The pulse amplifier 290 includes the vacuum tube 308, the pulse transformer 316 and associated circuitry. The vacuum tube 308 comprises the cathode 314, the grid 312 and the anode 310. The pulse transformer comprises the primary winding 318 and the secondary windings 320 and 322.

The crystal diode 294 couples the grid 312 of the vacuum tube 308 to the input terminal 292, the anode 296 of the crystal diode 294 being coupled to the input terminal 292, and the cathode 298 being coupled to the grid 312. The negative supply bus 70 is coupled to the grid 312 via the resistor 300 and tends to make the crystal diode 294 conductive. The grid 312 and the cathode 298 of the crystal diode 294 are also coupled to the cathode 304 of the crystal diode 302, whose anode 306 is coupled to the negative supply bus 5. The crystal diode 302 clamps the rigid 312 at a potential of minus five volts thus preventing the voltage applied to the grid 213 from becoming more negative than minus five volts.

When a voltage more positive than minus five volts is transmitted to the input terminal 292, the crystal diode 294 conducts and the voltage is applied to the grid 312. Since the crystal diode 302 clamps the grid 312 and the cathode 298 of the crystal diode 294 at minus five volts, any voltage more negative than minus five volts will cause the crystal diode 294 to become nonconductive, and that input voltage will be blocked at the crystal diode 294. Thus, the clamping action of the crystal diode 302 will not affect the circuitry which supplies the input voltage.

The cathode 314 of the vacuum tube 308 is connected to ground potential. The anode 310 of the vacuum tube 308 is coupled by the primary winding 318 of the pulse transformer 316 to the positive supply bus 250. The outer ends of the secondary windings 320 and 322 of the pulse transformer 316 are coupled respectively to the positive output terminal 324 and the negative output terminal 326. The inner ends of the secondary windings 320 and 322 are coupled respectively to the negative supply bus 10 and the positive supply bus 5.

A positive pulse which is fed to the grid 312 of the vacuum tube 308 will be inverted at the primary winding 318 of the pulse transformer 316 which is wound to produce a positive pulse in the secondary winding 320 and a negative pulse in the secondary winding 322. These pulses respectively drive the positive output terminal 324 up to a positive five volts potential and the negative output terminal 326 down to a negative ten volts potential because of the circuit parameters.

When the vacuum tube 308 is non-conducting, the negative ten volts potential is fed through the secondary winding 320 and appears at the positive output terminal 324. At the same time, the positive five volts potential is fed through the secondary winding 322 to the negative output terminal 326. These latter conditions are the normally existing conditions at the output terminals 324 and 326.

*Delay line*

The symbol for a representative electrical delay line 271 which is a lumped parameter type delay line and which functions to delay received pulses for discrete periods of time, is shown in Fig. 6*a*.

The delay line 271 comprises the input terminal 272, the output terminal 288, and a plurality of taps 280, 282 and 284. A pulse which is fed via the input terminal 272 to the delay line 271 will be delayed for an increasing number of pulse times before successively appearing at the taps 280, 282 and 284. When the pulse reaches the output terminal 288, the total delay provided by the delay line 271 has been applied. In the text, the specific number of pulse-times delay which is encountered before a pulse travels from the input terminal to a tap of the delay line has been stated.

The delay line 271 shown in Fig. 6*b* comprises a plurality of inductors 276 connected in series, with the associated capacitors 278 which couple a point 274 on each inductor 276 to ground. A signal is fed into the delay line 271 at the input terminal 272 and the maximum delay occurs at the output terminal 288. The taps 280, 282 and 284 are each connected to one of the points 274 and provide varied delays. The delay line 271 is terminated by a resistor 286 in order to prevent reflections. Although the delay line of Fig. 6*b* a tap is shown connected to each of the points 274, it should be understood that in actual practice there are ordinarily several untapped points 274 between successive taps.

*Reshaper*

A reshaper of the type used in the apparatus is an electronic circuit which functions to reshape and retime positive pulses which have become poorly shaped and attenuated.

The symbol for a representative reshaper 328 is illustrated in Fig. 7*a* and comprises one or more input terminals of which the input terminals 330 and 331 are shown, timing terminal 338 which receives reshaping and retiming pulses (also designated clocking or C pulses), positive output terminal 344, negative output terminal 346, and blocking terminal 336 through which signals may be sent to make the reshaper 328 inoperative.

Except when positive pulses are fed to the iput terminals 330 and 331 of the reshaper 328, a negative potential of ten volts is present at the positive output terminal 344 and a positive potential of five volts exists at the negative output terminal 346.

When a pulse is fed to the reshaper 328 via one or both of the input terminals 330 and 331, the pulse is reshaped by a clock pulse (received via the terminal 338), which is timed to delay the reshaped pulse for one-quarter of a pulse time, and is then transmitted from the reshaper 328 via the positive output terminal 344. While the positive pulse is being transmitted from the positive output terminal 344, a negative pulse is transmitted from the negative output terminal 346.

The detailed circuitry of the reshaper 328 is illustrated in Fig. 7*b* in which use is made of logical symbols previously described.

The reshaper 328 comprises the buffer 332, the gate 334 and the pulse amplifier 342 connected in series. A positive pulse which is fed via one or both of the input terminals 330 and 331 of the buffer 332 is passed to the gate 334. Signals may also be fed via the blocking terminal 336 to the gate 334 and if the signal is negative, the gate 334 is blocked and the reshaper 328 is inoperative. The blocking terminal 336 is generally absent and if present usually receives a positive signal.

A series of identical clock pulses which are generated in the clock pulse generator are transmitted to the gate 334 via the clock terminal 338. The clock pulses are equal in magnitude and width to the desired shape and timing of the pulses which are to be reshaped and retimed. The clock pulses are timed so that the starting time of each clock pulse coincides approximately with the center of the pulse it is intended to reshape. This is done to assure that the pulse to be reshaped will have reached its maximum amplitude by the time the leading edge of a clock pulse arrives at the gate 334. Since in many cases the pulse to be reshaped is originally produced by a previous reshaper and thus has approximately the same width as a clock pulse, its center point will be one-quarter pulse time later than the leading edge of the clock pulse which previously reshaped it. Hence its leading edge after passing through the new reshaper will be one-quarter pulse time later than before, and on this basis it may be said that a reshaper introduces a one-quarter pulse time delay in the signals passing through it.

When the attenuated positive pulse reaches its full magnitude at the gate 334, the coinciding clock pulse is gated through to the amplifier 342 and is amplified and causes a positive pulse to be transmitted from the positive output terminal 344, and a negative pulse to be transmitted from the negative output terminal 346 at the same time.

The positive output terminal 344 is also coupled to one input of the buffer 332 so that a positive signal which appears at the positive output terminal 344 is regenerative and will continue to exist until the clock pulse terminates at the gate 334. This effectively permits the entire clock pulse to be gated through the gate 334, even though the original pulse has decayed before the end of the clock pulse.

Stated more generally, a clock pulse is passed through the gate 334 from the earliest coincidence of that clock pulse with the full magnitude of the attenuated pulse until the termination of that clock pulse. As a result, a clock pulse is substituted for the attenuated pulse in the system after a delay of one-quarter of a pulse time.

*Drum-reading amplifier*

The symbol for a representative drum-reading amplifier 370 is shown in Fig. 8*a*. The drum-reading amplifier 370 functions to amplify drum signals which are generated when a magnetic drum is rotated past a magnetic head which is coupled to the input terminal 372. The amplified signals appear at the output terminal 374.

As shown in Fig. 8*b*, the drum-reading amplifier 370 includes the transformer 376 and the vacuum tubes 384 and 385. The transformer 376 comprises the primary winding 378 connected to the input terminal 372, the secondary winding 380 which couples the control grid 388 of the vacuum tube 384 to ground, and a core 356 provided with an electrostatic shield which is connected to ground to prevent noise from being fed to the control grid 388. The resistor 382 is in parallel with the secondary winding 380. The vacuum tube 384 also includes the anode 386 which is connected via the resistor 394 to the positive supply bus 250, and the cathode 390 connected via the resistor 392 to round.

The vacuum tube 385 comprises the anode 387 connected via the resistor 395 to the positive supply bus 250, the control grid 389 connected via the resistor 383 to the negative supply bus 1, and the cathode 391 connected to ground. The anode 386 of the vacuum tube 384 is coupled via the capacitor 396 to the control grid 389 of the vacuum tube 385. The anode 387 of the vacuum tube 385 is connected via the capacitor 397 to the output terminal 374.

When a signal is read from the magnetic drum by the magnetic head it is applied to the primary winding 378 of the transformer 376, the secondary winding 380 of the transformer 376 applies an amplified signal to the control grid 388 of the vacuum tube 384. The signal is amplified by vacuum tubes 384 and 385 to produce an amplified signal at the output terminal 374.

Thus an improved magnetic recording system has been shown which generates a waveform having no steady voltage component. Such a waveform permits the use of A.-C. coupling elements so that the full advantage of such elements is gained. In addition the nature of the recording waveform permits the use of smaller components since the elements associated with the current sources are used a small fraction of the time duration of the waveform.

There will now be obvious to those skilled in the art many modifications and variations utilizing the principles set forth and realizing many or all of the objects and advantages of the circuits described but which do not depart essentially from the spirit of the invention.

What is claimed is:

1. Apparatus for generating current waveforms which are related to electrical signals having either one of two characteristics comprising control means responsive to said signals, first and second pulse forming means alternately responsive to said control means in accordance with the characteristic of said electrical signal which is present for forming pulses such that at any given time said first pulse forming means forms a first pair of pulses sequentially, one on each of a pair of output leads, or said second pulse forming means forms a second sequential pair of pulses, one on each of a pair of output leads, pulse narrowing means in said output leads and responsive to said first and second pulse forming means for narrowing the formed pulses into spaced pulses with a predetermined time interval between pulses and a current waveform generator responsive to said pulse narrowing means for converting each spaced pair of pulses to a spaced pair of current pulses having opposite polarities, the current pulses produced by the pulses from said second pulse forming means being opposite in polarity to those produced by the pulses from said first pulse forming means.

2. Apparatus for magnetically storing information as represented by the presence or absence of information pulses in a signal waveform, each pulse of which has a fixed predetermined time duration comprising control means responsive to the presence or absence of a pulse, first and second waveform generators responsive to said control means such that either one or the other is operable, said first and second waveform generators when operable generating a pair of pulses, each pulse being of shorter time duration than said information pulses and spaced from the other pulse by a fixed time interval, a current generator responsive to the spaced pulses from said first and second waveform generators for producing spaced current pulses of opposite polarity, the current pulses produced when said second waveform generator is operable being opposite in polarity to the corresponding pulses produced by operation of said first waveform generator, and recording means responsive to said current waveform generator for recording the current pulses.

3. Apparatus employing a clock pulse generator for magnetically storing information as represented by the presence or absence of information pulses in a waveform synchronized with said clock pulse generator, each pulse of which has a time duration equal to the clock pulses, comprising control means responsive to the presence or absence of a pulse, first and second waveform generators selectively operated by said control means in accordance with the presence or absence of an information pulse such that either one or the other is operable at one time, said first and second waveform generators each generating a pair of spaced pulses, each pulse being of shorter time duration than the clock pulses and separated by a time interval substantially equal to the duration of a pulse, and a current waveform generator responsive to said first and second waveform generators for producing a current waveform, each portion of which is composed of a pair of current pulses having opposite polarity and temporally spaced from each other by a time interval approximately equal to the duration of a pulse, the current pulses produced in response to operation of said first waveform generator having a predetermined polarity first and those produced in response to operation of said second waveform generator having said predetermined polarity in second position.

4. Apparatus for generating current waveforms which are related to electrical signals having either one of two characteristics comprising a control means responsive to said electrical signals and having two outputs, a first output being energized when said signals have one characteristic and the second output being energized when said signals have the other characteristic, and a pulse generator controlled by one of said outputs to produce a first pulse on one of two terminals and a second pulse on the other of said terminals a predetermined time interval after the termination of said first pulse, said generator being controlled by the other of said outputs to produce a complementary pulse pattern on said terminals, said two pulses having a total duration substantially less than the time duration of each of said electrical signals.

5. Apparatus for generating current waveforms which are related to electrical signals having either one of two characteristics comprising a control means responsive to said electrical signals and having two outputs, a first output being energized when said signals have one characteristic and the second output being energized when said signals have the other characteristic, a pulse generator controlled by one of said outputs to produce a first pulse on one of two terminals and a second pulse on the other of said terminals a predetermined time interval after the termination of said first pulse, said generator being controlled by the other of said outputs to produce a complementary pulse pattern on said terminals, said two pulses having a total duration substantially less than the time duration of each of said electrical signals, a current generator connected to said terminals and controlled by pulses thereon to produce a current pulse of a first polarity when a pulse appears on one terminal and a current pulse of the opposite polarity when a pulse appears on the other of said terminals, and means to record said current pulses.

6. Apparatus for generating current waveforms which are related to electrical signals having either of two characteristics comprising a normally inactive current generator having two input terminals, said generator being responsive to application of a voltage at one of said terminals to produce current of one waveform and being responsive to application of a similar voltage at the other of said terminals to produce a current of a second waveform, a control means responsive to said electrical signals and having at least two outputs, one of said outputs being energized for each characteristic of said signals, a pulse forming means connected to one of said outputs and energizable thereby to produce a pulse having a fixed time duration at a first one of said terminals and to produce a second pulse having a fixed time duration and at a fixed time delay after the end of said first pulse at the other of said terminals, and a second pulse forming means energizable by the other of said outputs and energizable thereby to produce a third pulse having a fixed time duration at the other of said terminals and to produce a fourth pulse having a fixed time duration and appearing at a fixed time delay after the end of said third pulse to the first one of said terminals.

7. Apparatus for generating current waveforms in the form of two current pulses having opposite directions of flow and separated by a fixed time interval comprising a source of signals having either of two characteristics, a control means responsive to said signals to energize one or another of two pulse forming means, one of said pulse forming means, when energized, generating a pulse on one output terminal and thereafter generating a second pulse on another terminal and the other pulse forming means, when energized generating a first pulse on said second terminal and thereafter generating a second pulse on said first terminal, a pulse narrowing means to pass central portions of said pulses with a fixed time interval between the pulses from the energized one of said pulse forming means and a current generator activated by said passed pulses to produce a current flow in one direction when a pulse is received from said first terminal and to produce a current flow in the opposite direction when a pulse is received from said second terminal.

References Cited in the file of this patent

UNITED STATES PATENTS 2,609,143 Stibitz ---------------- Sept. 2, 1952

2,679,025 Rajchman ---------------- May 18, 1954
2,700,155 Clayden ---------------- Jan. 18, 1955
2,729,809 Hester ---------------- Jan. 3, 1956
2,734,186 Williams ---------------- Feb. 7, 1956
2,764,463 Lubkin et al. ---------------- Sept. 25, 1956

FOREIGN PATENTS 494,234 Belgium ---------------- Mar. 31, 1950
707,634 Great Britain ---------------- Apr. 21, 1954